(12) United States Patent
Paul (10) Patent No.: US 6,170,386 B1
(45) Date of Patent: Jan. 9, 2001

(54) FOOD PREPARATION

(76) Inventor: Claire Cecilia Paul, East Harting Farmhouse, East Harting, Petersfield, Hampshire GU31 5LU (GB)

( * ) Notice: Under 35 U.S.C. 154(b), the term of this patent shall be extended for 0 days.

(21) Appl. No.: 09/202,364

(22) PCT Filed: Jun. 10, 1997

(86) PCT No.: PCT/GB97/01557

§ 371 Date: Dec. 10, 1998

§ 102(e) Date: Dec. 10, 1998

(87) PCT Pub. No.: WO97/47224

PCT Pub. Date: Dec. 18, 1997

(30) Foreign Application Priority Data

Jun. 12, 1996 (GB) .................................................. 9612234

(51) Int. Cl.[7] .................................................. A47J 36/26
(52) U.S. Cl. ............................. 99/281; 99/323.3; 99/275; 222/146.5
(58) Field of Search .................................. 99/323.3, 300, 99/275, 483, 536, 281; 222/146.2, 146.5

(56) References Cited

U.S. PATENT DOCUMENTS

| | | | |
|---|---|---|---|
| 4,191,101 | * 3/1980 | Ogawa et al. | 99/323.3 |
| 4,357,861 | * 11/1982 | Di Girolamo | 99/323.3 |
| 4,560,455 | 12/1985 | Porta et al. . | |
| 4,791,860 | * 12/1988 | Verheijen | 99/323.3 |
| 4,978,833 | * 12/1990 | Knepler | 99/281 X |
| 5,397,031 | * 3/1995 | Jensen | 222/146.5 |
| 5,671,325 | * 9/1997 | Roberson | 222/146.5 X |

FOREIGN PATENT DOCUMENTS

| | | |
|---|---|---|
| 31 10 060 A1 | 11/1982 | (DE) . |
| 35 11 159 A1 | 10/1986 | (DE) . |
| 0 510 863 A2 | 10/1992 | (EP) . |
| 2 240 465 | 8/1991 | (GB) . |
| WO 89/02239 | 3/1989 | (WO) . |
| WO 93/18695 | 9/1993 | (WO) . |

OTHER PUBLICATIONS

Searh Report Under Section 17(5) dated Aug. 16, 1996.

PCT Notification Of Transmittal Of The International Search Report dated Jun. 10, 1997.

Exhibit A—"Tiger", 1994 No. 29, which illustrates a device referred to as an air pot.

* cited by examiner

Primary Examiner—Reginald L. Alexander
(74) Attorney, Agent, or Firm—Harness, Dickey & Pierce, P.L.C.

(57) ABSTRACT

A food preparation device can be used for making up formula milk for a baby. The device includes a water tank in which water may be boiled by operating a boil button. Once the boiled water has cooled down to a temperature below a predetermined temperature, the previously boiled water may be reheated to the predetermined temperature by operating a button. Operating the button causes water in the tank to be reheated to the predetermined temperature and to be discharged to a bottle received in a bottle receiving station. If dehydrated formula milk powder has previously been added to the bottle, once discharge is complete the bottle may be capped with a teat, shaken to mix the powder with the water, and used to feed a baby or toddler.

56 Claims, 4 Drawing Sheets

FOOD PREPARATION

This invention relates to improvements in and relating to the preparation of food, including drinks and beverages. The invention has particular application to hot food and/or drink preparation devices particularly, but not exclusively, to devices for assisting in the preparation of a bottle of "formula" milk for a baby or toddler.

Formula milk for a baby or toddler requires boiled water to be added to formula milk powder. Boiled water must be used to ensure that the water is sterilized. However, at the time of mixing the sterilized water with the powder the water should not be boiling; instead it should be at a reduced temperature. Clearly, when the made-up formula milk is fed to the baby or toddler it must be at an appropriate feeding temperature well below boiling, suitably 45–55° C.

In making up a bottle of formula milk it is conventional to boil water in a kettle or pan to help to sterilize it, wait for it to cool to approximately 50° C. and then add it to a baby feeding bottle. The formula milk powder may already have been placed in the bottle or else be added to the bottle following the addition of the hot, boiled water. Once the powder and water have mixed to form a bottle of formula milk the bottle may then be used to feed a baby or toddler, subject to it being cooled or heated to an appropriate feeding temperature if necessary. If, however, the bottle is being made in advance of being required, once it has cooled to room temperature it must be stored in a fridge and, when required, heated to an appropriate feeding temperature before being fed to the baby or toddler.

This procedure is not convenient. Furthermore, if a baby or toddler should wake during the night and require feeding, even if a bottle has been made up in advance it is necessary to retrieve it from the fridge and to monitor its warming to an appropriate feeding temperature before the baby or toddler can be fed.

According to one aspect of the present invention there is provided a food preparation device comprising:
- a water tank for holding water;
- at least one bottle-receiving station for receiving a bottle which may contain dehydrated food preparation formulation and for the controlled discharge thereto from the tank of heated water;
- first water heating means arranged to boil water in the tank;
- second water heating means arranged to reheat to a predetermined maximum temperature below 100° C. tank water which has previously been boiled in the tank and which has then been allowed to cool to below said predetermined temperature;
- selecting means for selecting operation of said water heating means either to boil tank water or to reheat it only to said predetermined temperature; and
- regulating means for regulating the discharge of tank water from the tank to said at least one bottle-receiving station, said regulating means being arranged to permit the discharge of tank water reheated to said predetermined temperature.

Advantageously the first and second water heating means comprise a single heater positioned in the tank.

The device preferably comprises a plurality of bottle-receiving stations, each of which may have a bottle placed therein already containing an appropriate amount of a powdered beverage formulation. The selecting means may include a first user-activatable switching means to permit a user to operate the heater to boil water contained in the tank.

The selecting means also advantageously includes a plurality of second user-activatable switching means, one for each bottle receiving station. By activating one or more of these second switching means the user can cause the heater to heat the previously boiled water in the tank to the predetermined, reduced temperature (for example, 45–55° C.) and to discharge the heated water at this reduced temperature to the bottle-receiving station or stations associated with the second user-activatable switching means selected and activated by the user. In this way, if the device for example comprises six bottle-receiving stations and has six second user-activatable switching means, if the user activates only two of those second user-activatable switching means, water at the reduced temperature can be discharged to bottles in two of the bottle-receiving stations only. In this way, a user can easily select the number of bottles of feed to be made up.

According to a second aspect of the present invention there is provided a preparation device comprising:
- means for providing a supply of liquid to be heated;
- means for boiling the liquid supply; and
- means for re-heating the previously boiled liquid to a reduced temperature; and
- means for discharging the re-heated liquid at said reduced temperature to a receptacle;
- wherein said device is operable, according to user choice, either (i) in a boiling mode to boil the liquid supply or (ii) to re-heat the previously boiled liquid to said reduced temperature and to discharge it.

Embodiments of the invention will now be described, by way of example only, with reference to the accompanying drawings, in which.

Figure 1:
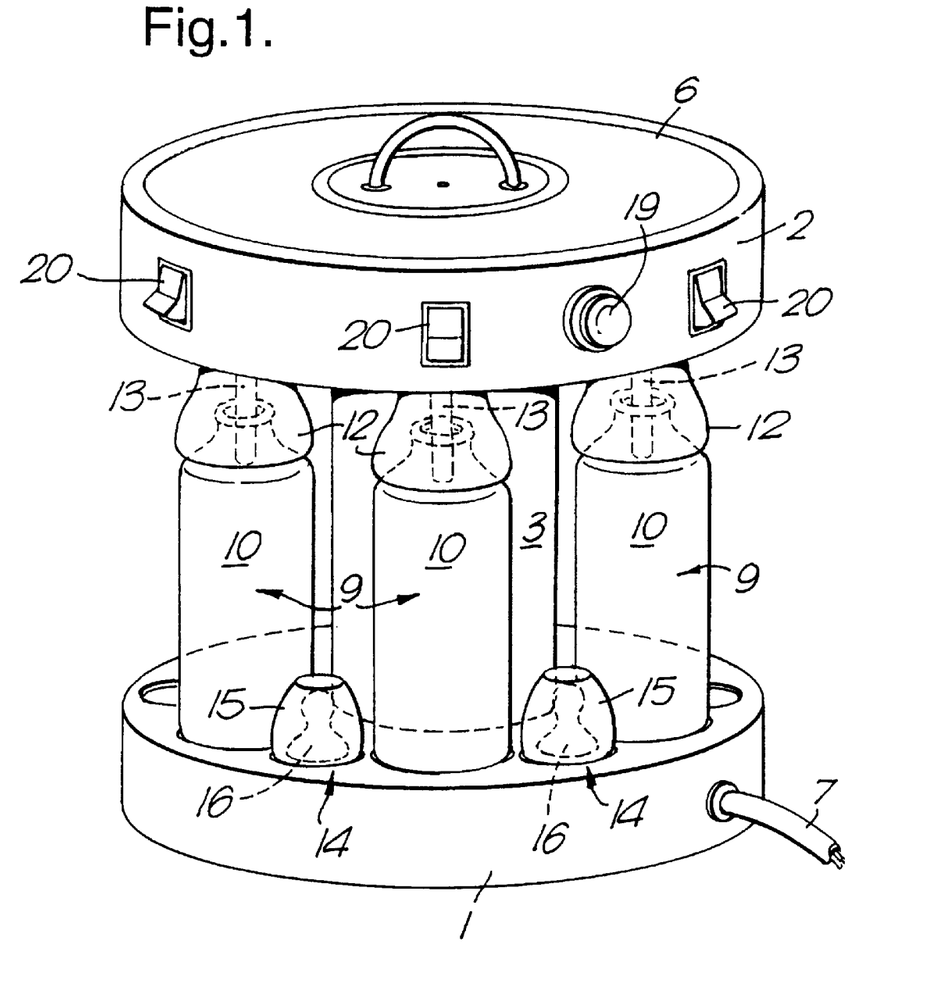
FIG. 1 shows, in perspective view, a first embodiment of a device having six bottle-receiving stations.
Figure 2:
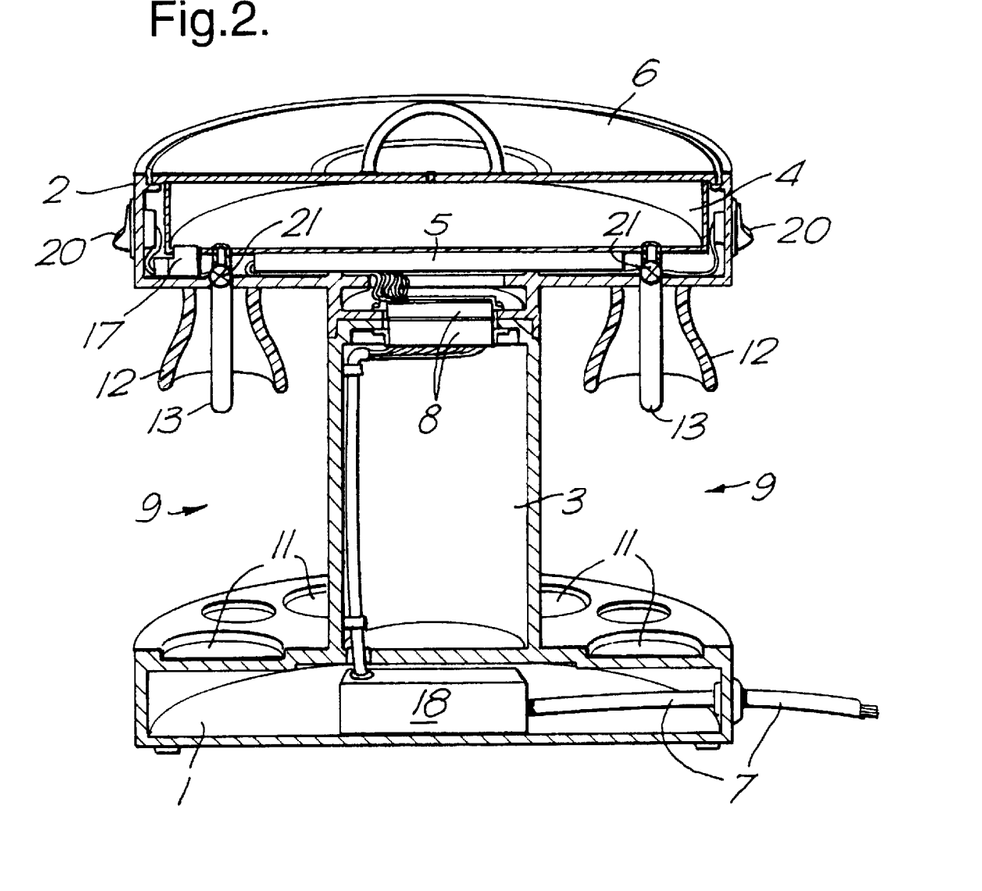
FIG. 2 is a part-schematic, cross-sectional view along the longitudinal axis of the device of FIG. 1 and through two bottle-receiving stations, showing the bottles removed from the bottle-receiving stations and with teat-covering lids removed.

The first embodiment illustrated in FIGS. 1 and 2 of the drawings comprises a base 1, a top 2 and a hollow, central column 3 therebetween. The top 2 contains a water tank 4 which contains a heater element 5. The top 2 and tank 4 are removable with the heater element 5 from the central column 3 so as to allow the tank to be emptied, cleaned and re-filled. The heater element 5 may be of a conventional plate (as shown) or coil construction such as is conventionally found in electric kettles. For ease of use, the tank 4 is provided with a removable lid 6. This also allows the tank 4 to be filled in-situ.

A releasable lock (not shown) may be provided to lock the top 2 to the column 3 to prevent its inadvertent removal.

In the first illustrated embodiment the water tank 4 is formed integrally with the top 2. Part of the top 2 may, however, be formed integrally with the column 3, and the tank 4 be removable from the interior of that part of the top 2.

The base 1, top 2 and column 3 may be made of any suitable material. The tank 4 (and the top 2) may, for example, be formed from a heat-resistant and easily cleanable material such as stainless steel or a plastics material and may be externally insulated to reduce the risk of burns.

The electrical supply to the heater 5 is via an electrical flex 7. A make-and-break electrical connector 8, of the sort conventionally used in cordless kettles and irons, is provided at the top of column 3 to provide power to the heater 5 whilst still allowing for the top 2 to be removable. The electrical elements visible inside the device in FIG. 2 are shown schematically.

The first illustrated embodiment comprises six bottle-receiving stations 9. In FIG. 1 three of these stations are visible and each of these three is shown as receiving a sterilized bottle 10. The bottle 10 may be a conventional baby/toddler feeding bottle suitable for containing an approximately 8 fluid ounce feed. To define each bottle-receiving station the base 1 of the device may, as shown, be provided with six recesses 11, each to receive the lower portion of a bottle 10.

In the first illustrated embodiment the top 2 is provided with air-tight sealing means 12 for sealing against the open, upper ends of bottles received in the stations 9. Each sealing means 12 comprises a generally annular cup-shaped element downwardly depending from the top 2 to seal against the upper shoulder of the bottle 10 received in the respective station 9. In this way the risk of contamination of a sterilized bottle 10 inserted into a station 9 can be reduced. The annular seal elements 12 may advantageously be made of resiliently flexible clear plastics material so as to allow the top of a bottle 10 to be inserted into its seal 12, pushed upwardly against the resilience of the seal to deflect the seal, and then to have its base swung inwardly and downwardly into the recess 11 for that station 9.

At each bottle-receiving station 9 a pipe 13 depends downwardly from the top 2 internally of and coaxially with the respective annular sealing element 12, to direct discharged water into the respective bottle 10, as will be explained below.

Advantageously, as shown, between each bottle-receiving station 9 there is shown an air-tight teat storage station 14. Each teat storage station comprises an area of the base 1 and a cap 15 sealingly engaged with the base 1 to define therebetween a compartment for the storage therein of a sterilized teat, ring and cap 16, as shown. The base area of each teat storage station may be recessed, as is most clearly shown in FIG. 2. The cap 15 is removable from sealing engagement with the base to allow the extraction from the compartment of a teat, ring and cap. The air-tight sealing engagement between the caps 15 and the base 1 helps to reduce the risk of contamination of a sterilized teat 16 placed in the station compartment.

In the top 2 a thermostat 17 is exposed to the temperature of water contained in the tank 4. This thermostat 17 provides an input to a control means such as a microprocessor controller 18, as shown schematically in FIG. 2.

The top 2 is provided with selecting means for activating the heater 5. In the first illustrated embodiment the selecting means includes a first user-activatable switching means, in the form of a button 19 which may be marked "BOIL" for allowing a user to activate the water heater 5 in a boil mode. This button 19 is connected to a microprocessor controller 18 by a connection (not shown). When button 19 is depressed by the user the microprocessor controller 18 switches on the heater 5 to heat the water contained in the tank. When the thermostat 17 senses that the water temperature has reached boiling the microprocessor controller 18 cuts the power supply to the heater 5. The BOIL button 19 may be lit from behind once the water in the tank has reached 100° C. and the heater switched off so as to provide a visual indication to the user of the temperature of the water. The light behind the button may be arranged to switch off once the temperature of the water in the tank drops to a predetermined temperature, for example 45–55° C. Advantageously, a safety cut out (not shown) may be provided to prevent the heater 5 from operating if the button 19 is depressed and the tank contains little or no water.

In the first illustrated embodiment the selecting means provided in the top 2 further includes a plurality of second user-activatable switching means, each in the form of a switch 20. Each switch is connected to the microprocessor controller 18; two of the connections are shown schematically in FIG. 2. Each bottle receiving station 9 is associated with a respective said switch 20; only three such switches are visible in FIG. 1.

Upon switching a switch 20 the microprocessor controller 18 advantageously senses the temperature of water in the tank 4 using the thermostat 17. If the water temperature is below a predetermined threshold temperature (for example, 45–55° C.) and there is sufficient water in the tank 4, the controller 18 switches on the heater 5 to increase the temperature of water in the tank 4 to that temperature. Once the water temperature reaches the threshold temperature the microprocessor controller 18 cuts the power supply to the heater 5 and discharges heated water, at approximately the threshold temperature, to the bottle-receiving station or stations 9 associated with the switched switch or switches 20. If a switch 20 is switched and the BOIL button 19 has only recently been pressed such that the tank water temperature is above the threshold temperature, heater 5 is not switched on, nor is any water discharged.

Discharge of water at approximately the threshold temperature is achieved by regulating means. In the first illustrated embodiment these regulating means take the form of a plurality of automatically controlled electrically operated valves 21, one provided for each bottle-receiving station 9. Two such valves 21 are shown only schematically in FIG. 2, as are their electrical connections to the controller 18. Each valve 21 is selectively openable by the microprocessor controller 18 so as to allow the passage of water from the tank 4 down the associated tube 13 to its respective bottle-receiving station 9. By opening a valve 21 for a predetermined time the amount of heated water discharged can be metered to an appropriate amount. In the case of a baby bottle, an average bottle size is approximately 8 fluid ounces.

As a non-illustrated alternative to the illustrated arrangement in which discharge of a metered amount of water takes place automatically upon the predetermined temperature being reached, the discharge may be controlled manually by the user following the heater 5 being switched off on the predetermined temperature being reached.

Ideally, the microprocessor control means 18 includes a safety feature whereby if the water temperature sensed by the thermostat 17 is greater than the threshold temperature under no circumstances can the valves 21 be opened to discharge water.

it will be appreciated that the preferred use of a microprocessor controller 18 to control operation of the heater 5 and valves 21 enables the ready achievement of safety features and also features which render the device more versatile. For example, the device may be provided with an override control (not shown) for enabling a user to stop the discharge of re-heated water to a bottle-receiving station before the normal, predetermined amount of re-heated water has been discharged, to enable a part-bottle feed to be prepared, and/or to prolong the discharge of re-heated water beyond said predetermined amount.

The first illustrated embodiment of the invention uses gravity to discharge heated water from the tank 4 to a bottle-receiving station 9. However, alternatively or additionally, pumping means may be provided. The pumping means may take the form of a pump of the type conventionally used in drinks vending machines, whereby the period of pump operation dictates the amount of fluid pumped.

In the above-described first embodiment, when a switch 20 is switched to activate the heater 5 to heat the water to the predetermined threshold temperature, the whole contents of the tank 4 are heated and only a portion thereof may be discharged. In an alternative arrangement (not shown), when a switch 20 is switched heating means separate from the heater 5 may be utilised. For example, the device may be provided with a syphon-type heater for each bottle-receiving station 9. Such heaters are commonly found in domestic filter coffee-making machines in which cold water from a reservoir is slowly admitted into a heating passage containing a one-way valve and the heating of the water is used to pump the water into a filter containing coffee-grounds. By using such a heater/pump in the device of the present invention one could avoid the need to heat all of the water to the threshold temperature, reducing the amount of time required to fill just one bottle with water of the correct temperature in the case where the tank 4 contains a large volume of water.

To help illustrate the features of the first illustrated embodiment of the invention, an exemplary procedure involving the device will now be described. In the following procedure the device is used to prepare a bottle of formula milk for a baby or toddler. The device is not, however, intended to be limited to this use alone or to use in accordance with the precise procedure described. It may, for example, be used in the preparation of drinks for adults, or for the preparation of foods for adults or children.

In an exemplary procedure the device is first prepared. Preparation will involve some or all of the bottle-receiving stations having sterilized bottles 10 fitted therein. Prior to fitting them the sterilized bottles 10 may have had an appropriate amount of powdered baby/toddler milk formulation added thereto.

Preparation will also involve checking that the tank 4 contains sufficient water. Ideally the tank 4 is removed from the remainder of the device and emptied of any residual water, and perhaps also cleaned. It can then either be filled and returned to the device containing water, for example 40 fluid ounces of water (enough to make approximately 5 conventional 8 fluid ounce baby bottles) or replaced on the device empty and then filled through the aperture normally closed by the lid 6. The BOIL switch 19 is then pressed to cause the heater 5 to boil the whole contents of the tank 4. The device may now be left. Once boiling of the water is detected via thermostat 17 the microprocessor controller 18 automatically switches off the power supply to the heater 5. The water contained in the tank 4 can then be allowed to cool. Over several hours it will cool to approximately room temperature. The device is now in a prepared, ready-to-use condition.

Several hours later, when a baby or toddler is required to be fed, a switch 20 is switched. If two bottles of baby/toddler feed are required, two such switches 20 are switched. Upon operation of one or more switches 20 the microprocessor controller 18 again activates heater 5. However, in contrast to when the BOIL switch 19 is pressed, once the water in the tank 4 has been heated to the predetermined, threshold temperature (in the case of a baby bottle preparation device, approximately 45–55° C.), the microprocessor controller 18 automatically cuts the supply of power to the heater 5 and opens the valves 21 of the bottle-receiving stations 9 whose switches 20 were switched. By opening the valves 21 for a predetermined time period, or otherwise metering the amount of heated water discharged, approximately 8 fluid ounces of water at approximately the threshold temperature (45–55° C.) is discharged into each of the sterilized bottles 10 present in the bottle-receiving stations 9 associated with the selected and switched switches 20 only.

Once the appropriate amount of heated water has been discharged (or discharge is extended or prematurely terminated using an override switch, as described above) each of the filled bottles 10 can be removed from the device by lifting the bottle upwardly to deflect the respective resilient seal 12. If powdered baby/toddler milk formulation was added to the sterilized bottles prior to their being fitted to the device a sterile teat, ring and cap can be removed from a teat storage station and fitted to the removed bottle 10. Alternatively, if the sterilized bottles 10 were placed empty in the bottle-receiving stations, an appropriate amount of baby/toddler milk powder can be added between removing a bottle from the device and fitting a sterile teat, ring and cap to the bottle. By then shaking the bottle 10 the heated water can be caused to mix with the powdered beverage formulation present in the bottle, making the bottle ready for use. Several hours later the procedure of switching one or more switches 20, of stations still containing a bottle 10, may be repeated to obtain a further bottle or bottles of feed.

Due to the discharge of water from the tank 4, air will enter the tank during the discharge operation. A hole or one-way valve may, for example, be provided in lid 6 so as to admit air into the tank 4 in such a situation. To help to maintain as hygienic an environment in the tank as possible it is suggested that following discharge of water from the tank, following switching of a switch 20, the BOIL switch 19 be pressed so as to cause the remaining water in the tank to be boiled again. This is not, however, essential.

Despite the above precaution it is suggested that the tank 4 should be emptied on at least a daily basis. Each time the tank is re-filled it is suggested that the BOIL switch 19 be switched so as to cause the water to be boiled to avoid the need to have to do this (and then to allow the water to cool) when in due course it is required to prepare a bottle of feed.

So as to avoid the need for the device to meter the amount of water discharged it is envisaged that the tank 4 could be provided with internal partitions to partition the interior of the tank into a number of smaller reservoirs, each corresponding to a bottle-receiving station 9. In this way, an appropriate amount of water, for example eight fluid ounces, could be added to each reservoir so that, upon switching a switch 20, the valve 21 associated with the same station 9 can simply be open to admit all of the water contained in that station's reservoir.

As a further development of this idea, the tank 4 may be partitioned with internal weirs, again to divide the tank into a plurality of active reservoirs (one for each bottle-receiving station), together with a spare reservoir. In this way, when filling the tank 4 one could add water to the reservoir furthest away from the spare reservoir and allow the water successively to flow over the partitioning weirs so as to fill each of the active reservoirs with the correct amount of water.

In the FIG. 1 and 2 embodiment heating of the water to its reduced temperature (of approximately 45–55° C.) is achieved by switching any switch 20. Discharge of the water at that reduced temperature takes place automatically once the reduced temperature has been reached. In a non-illustrated variant of this embodiment the selecting means includes a single REHEAT switch, switching of which allows a user to commence reheating of the water to the reduced temperature. Once this temperature is reached the heater 5 is automatically switched off and no heated water is discharged. In this variant the switches 20 are used not as selecting means to initiate operation of the heater, but as manually operable regulating means to enable a user to discharge water at the reduced temperature. If, for example, the valve 21 of a bottle-receiving station 9 is linked to that station's switch 20, by switching the switch 20 the valve 21 may be caused to open. If the valve 21 is arranged to be directly controlled by the associated switch 20, by holding down the switch 4 for as long as a bottle takes to fill the switch can be used manually to meter out the required amount of water, avoiding the need for the device to be provided with automatic water discharge metering means.

Figure 3:
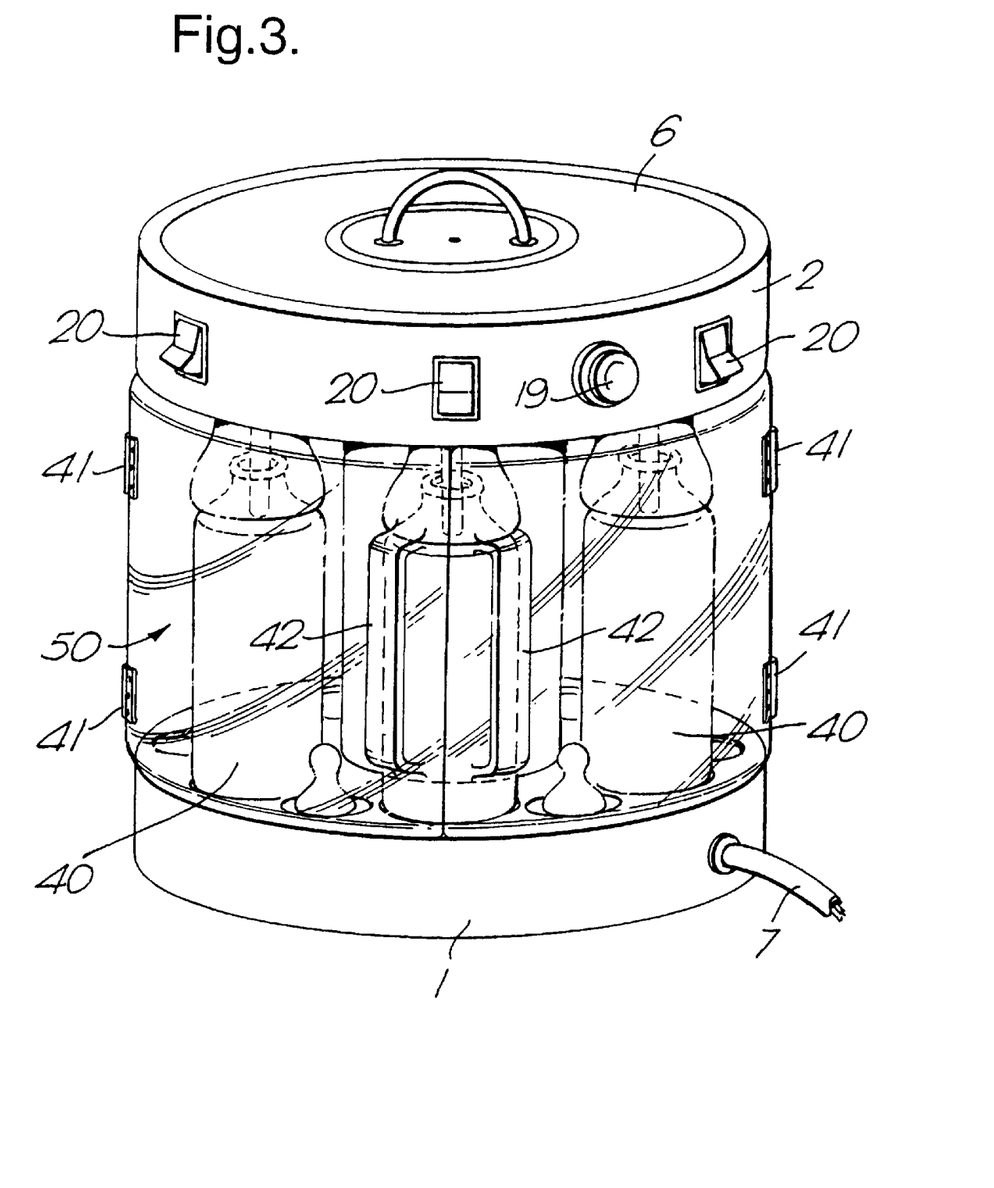
FIG. 3 shows, in perspective view, a second embodiment of a device in accordance with the present invention.

FIG. 3 shows a variant of the above-described devices. In the FIG. 3 variant the bottle-receiving stations are enclosed within a generally drum-shaped receptacle 50. This drum-shaped receptacle 50 may, as shown, advantageously be provided with a pair of doors 40, each provided with hinges 41 and a handle 42. When the doors 40 are closed, as shown in FIG. 3, the receptacle so formed may advantageously be generally air-tight. When, in use, access is required to a bottle-receiving station to permit the insertion or removal therefrom of a bottle 10 the doors 14 may be swung open on their hinges 41 to provide access. As shown in FIG. 3, in this variant caps for the teat storage stations 14 may be omitted due to the extra protection afforded by the receptacle.

Figure 4:
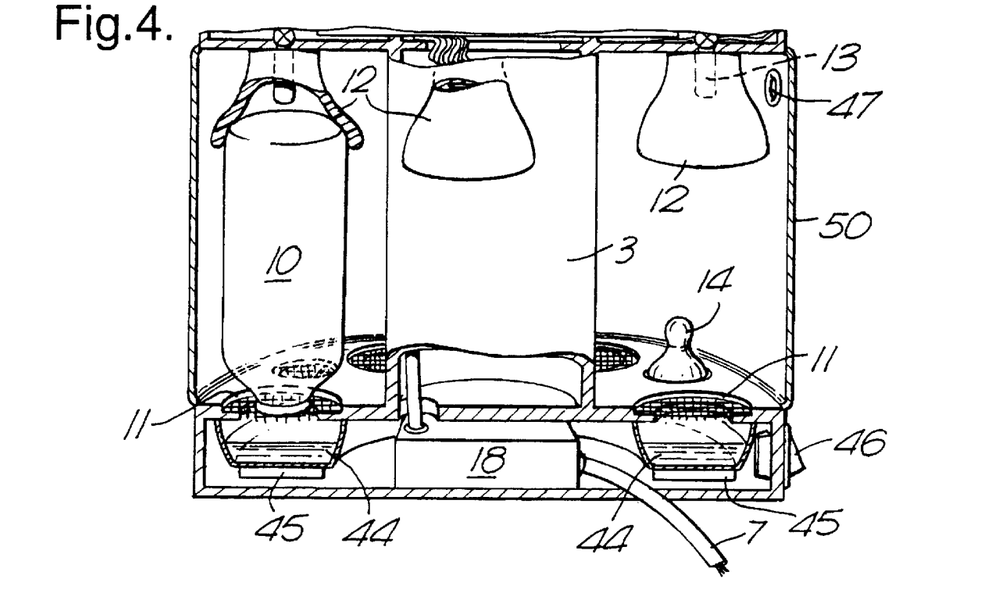
FIG. 4 is a part-schematic, cross-sectional view along the longitudinal axis of a third embodiment of a device in accordance with the present invention, showing the bottle-receiving stations and, in the base of the device, means for generating and supplying steam.
Figure 5:
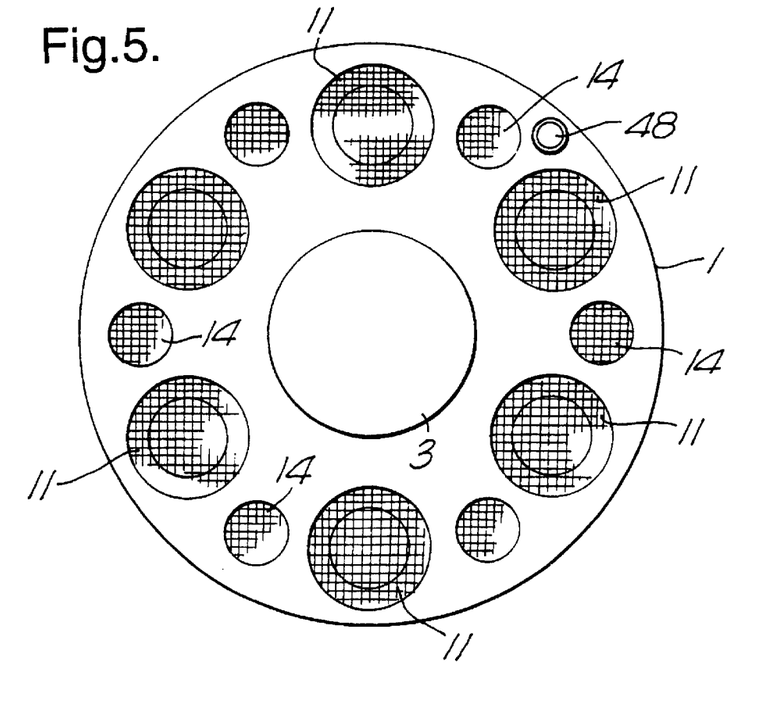
FIG. 5 is a schematic, cross-sectional view along the line V—V in FIG. 4, with the bottles removed.

FIGS. 4 and 5 illustrate a further variant of the FIG. 3 device. In FIG. 4 the top 2 of the device is omitted; it may be the same as in the earlier embodiments. In this further variant the base 1 of the device is provided with means for generating steam and supplying it to the interior of the enclosure or receptacle 50 enclosing the bottle-receiving stations 9. The steam generating and supplying means comprises an annular water tank 44 and heater plate 45 contained in the base of the tank 44. The heater plate 45 may be activated by a switch 46 provided on the base to boil water contained in the tank 44. In the illustrated embodiment the bases of the recesses 11 at the lower ends of the bottle-receiving stations 11 are formed from mesh to provide vents to the tank 44 to enable steam from the tank 44 to enter the interior of the receptacle 50. If, as shown, the bottles 10 received in the bottle-recieving stations are inverted the steam will pass over as well as into the bottles 10. Similarly, the bases of the teat storage stations 14 may be formed of gauze to allow steam to wash over the items placed therein over the central posts shown therein.

Activation and de-activation of the heater plate 45 may advantageously be provided by the microprocessor controller 18. Once the water in tank 44 has all been boiled off the heater plate 45 will be turned off by the microprocessor controller.

To enable the steam generated to exit the device a steam exit hole 47 is provided in a wall of the receptacle 50.

As shown in FIG. 5, the top surface of the base 1 is provided with an aperture 48 to allow water to be poured into the tank 44.

The on/off switch 46 is advantageously back-lit when the heater plate 45 is in operation.

Following activation of the steam generating and supplying means, once the bottles 10 have cooled sufficiently they may be removed from the bottle-receiving stations 9, charged with an appropriate amount of baby milk formulation and replaced in the bottle-receiving stations 9 in their upright positions as shown in FIGS. 1–3. Subsequent operation of the device is, for example, as described above in relation to the earlier embodiments.

The further variant of FIGS. 4 and 5 thus additionally has the means to sterilise bottles. The bottles may thus be sterilised using the steam generating and supplying means and then the water in the top tank 4 boiled, as a two-stage process to prepare the device, prior to it being needed to prepare food.

Although the device is illustrated as having six bottle-receiving stations the invention is applicable to devices having as few as one bottle-receiving station.

What is claimed is:

1. A food or drink preparation device comprising:

a water tank for holding water;

at least one bottle-receiving station for receiving a bottle which may contain dehydrated food or drink preparation formulation and for the controlled discharge thereto from the tank of heated water;

a water heater operable in a first heating mode to boil water in the tank and in a second heating mode to heat water in the tank from ambient temperature to a predetermined maximum temperature below boiling, whereby in said second heating mode to enable the reheating to said predetermined maximum temperature of water in the tank which has previously been boiled in the tank and which has then been allowed to cool to ambient temperature;

a heating mode selector for enabling a user to select operation of said water heater in either of said first heating mode and said second heating mode; and a regulator for regulating the discharge from the tank to said at least one bottle-receiving station of water reheated to said predetermined temperature.

2. A device as claimed in claim 1, wherein the regulator is arranged not to permit the discharge from the tank to said at least one bottle-receiving station of water above said predetermined temperature.

3. A device as claimed in claim 1, wherein said water heater comprises a water boiler for heating the water in said first heating mode and a water reheater for heating the water in said second heating mode.

4. A device as claimed in claim 3, wherein said water heater comprises a single heater element positioned in the tank.

5. A device as claimed in claim 1, wherein said predetermined temperature is approximately 45 C.–55 C.

6. A device as claimed in claim 1, further comprising a controller for automatically deactivating said water heater when the temperature of water in the tank reaches boiling following activation of said water heater by a user selecting operation of the water heater in said first heating mode.

7. A device as claimed in claim 6, wherein the controller is also arranged to automatically deactivate said water heater when the temperature of water in the tank rises to said predetermined temperature following activation of the water heater by a user selecting operation of the water heater in said second heating mode.

8. A device as claimed in claim 1, wherein the regulator includes a valve.

9. A device as claimed in claim 8 wherein, when there are a plurality of bottle-receiving stations, a said valve is provided for each bottle-receiving station for regulating the discharge of water at said predetermined temperature to its respective bottle-receiving station.

10. A device as claimed in claim 1, wherein said regulator is arranged to regulate automatically the discharge to said at least one bottle-receiving station of a predetermined amount of water heated to said predetermined temperature.

11. A device as claimed in claim 10, wherein the regulator further includes an override to allow a user to terminate prematurely or to extend the discharge of heated water so as to change from said predetermined amount the amount of heated water discharged.

12. A device as claimed in claim 10, wherein the regulator includes a metering unit for metering said predetermined amount of heated water, said predetermined amount being less than the full capacity of the tank.

13. A device as claimed in claim 1, wherein said heating mode selector includes a first user-activatable switch to allow a user to activate the water heater in said first heating mode to boil water in the tank.

14. A device as claimed in claim 13, wherein said heating mode selector also includes a second user-activatable switch to allow a user to activate the water heater in said second heating mode to reheat water in the tank to said predetermined temperature only.

15. A device as claimed in claim 14, wherein there are a plurality of bottle-receiving stations and said heating mode selector includes a separate said second user-activatable switch for each bottle-receiving station to allow the user to select a said station by switching the respective second user-activatable switch, thereby to activate the water heater in said second heating mode prior to the automatic discharge of water at said predetermined temperature only to the bottle-receiving station(s) corresponding to user-selected and switched said second user-activatable switch(es).

16. A device as claimed in claim 15, wherein the second user-activatable switch for each said station is provided on the device adjacent to its respective bottle-receiving station.

17. A device as claimed in claim 1, wherein the regulator is manually operable whereby, following reheating of the water to said predetermined temperature, the amount of water discharged may be manually regulated by a user.

18. A device as claimed in claim 17 wherein, when there are a plurality of bottle receiving stations, a separate switch is provided for each said station to allow a user to regulate manually the discharge of reheated water at said predetermined temperature.

19. A device as claimed in claim 1, further comprising a controller for controlling operation of the water heater and for controlling operation of the regulator whereby, during operation of the water heater in said second heating mode, the water heater is deactivated when the water temperature reaches said predetermined temperature and the regulator is then operable to allow water at said predetermined temperature to be discharged only to a user-selected bottle-receiving station.

20. A device as claimed in claim 19, wherein said controller is arranged to prevent operation of the water heater in said second heating mode when the temperature of water in the tank is at least equal to said predetermined temperature.

21. A device as claimed in claim 19, wherein said controller includes a thermostat exposed to the temperature of water in the tank.

22. A device as claimed in claim 19, wherein said controller includes a microprocessor.

23. A device as claimed in claim 1, wherein the device includes a top and the bottle-receiving station or stations is/are located underneath the top.

24. A device as claimed in claim 23, wherein the tank is provided in the top.

25. A device as claimed in claim 24, wherein the tank is removable from the device.

26. A device as claimed in claim 25, wherein the removable tank is provided with a make-and-break electrical connector for the supply of electrical power to the water heater.

27. A device as claimed in claim 23, wherein the top is provided with a seal for sealing against an open upper end of a bottle received in said at least one bottle-receiving station.

28. A device as claimed in claim 27 wherein the seal comprises a downwardly depending generally annular element arranged to seal against an upper portion of the received bottle.

29. A device as claimed in claim 28, wherein a pipe depends downwardly from the top, internally of and coaxially with the generally annular element, to direct discharged water into the received bottle.

30. A device as claimed in claim 1, wherein the device includes a base upon which, in use, a bottle received in the or each bottle-receiving station rests.

31. A device as claimed in claim 30, wherein the base is indented to receive and locate a lower portion of a received bottle.

32. A device as claimed in claim 30, wherein the base is provided with a teat storage station.

33. A device as claimed in claim 32, wherein the teat storage station comprises an area of the base and a cap sealingly engageable with the base to define with said area of the base a compartment for the storage therein of at least one sterilized teat, the cap being removable from sealing engagement with the base to allow the extraction therefrom of a sterilized teat.

34. A device as claimed in claim 32, wherein a plurality of bottle storage stations are provided and a separate teat storage station is provided for each bottle-receiving station.

35. A device as claimed in claim 1 in combination with a bottle, said bottle being received in said at least one bottle receiving station.

36. A device as claimed in claim 1, further comprising an enclosure substantially enclosing said at least one bottle-receiving station and any bottle received therein.

37. A device as claimed in claim 36, wherein the device further comprises a selectively operable steam generator for generating steam and supplying it to the interior of the enclosure.

38. A device as claimed in claim 37, wherein the steam generator is arranged to direct steam into the interior of a received bottle enclosed in the enclosure.

39. A device as claimed in claim 37, wherein the device has a base and the steam generator is provided in the base to direct steam into an inverted bottle received in said at least one bottle receiving station via an aperture provided in the base.

40. A device as claimed in claim 39, wherein at least one element extends across the aperture to support the inverted bottle whilst also allowing for the passage of steam through the aperture.

41. A device as claimed in claim 39, wherein the steam generator comprises a water receptacle and heater in the base.

42. A device as claimed in claim 36, wherein the enclosure is provided with at least one openable and closable door to allow for removal and replacement of a bottle in said at least one bottle-receiving station.

43. A device as claimed in claim 36, wherein the enclosure is vented to allow for the exit of steam from the housing.

44. A food or drink preparation device comprising:
- a water tank for holding water;
- at least one bottle-receiving station for receiving a bottle which may contain dehydrated food or drink preparation formulation and for the controlled discharge thereto from the tank of heated water;
- a water heater operable in a first heating mode to boil water in the tank and also operable in a second heating mode to heat, to a predetermined maximum temperature below boiling, water in the tank which has previously been boiled in the tank and which has then been allowed to cool to below said predetermined temperature; and
- a flow regulator for regulating the discharge of heated water from the tank to said at least one bottle-receiving station, said flow regulator being arranged to permit the discharge to said at least one bottle-receiving station of water at said predetermined temperature and to prevent the discharge to said at least one bottle-receiving station of water above said predetermined temperature.

45. A device as claimed in claim 44, wherein said flow regulator is arranged to prevent the discharge to said at least one bottle-receiving station of boiling water.

46. A device as claimed in claim 44, wherein said water heater comprises a water boiler for heating the water in said first heating mode and a water reheater for heating the water in said second heating mode.

47. A device as claimed in claim 46, wherein said water heater comprises a single heater element positioned in the tank.

48. A device as claimed in claim 44, wherein said predetermined temperature is approximately 45 C.–55 C.

49. A device as claimed in claim 44, wherein the regulator includes a valve.

50. A device as claimed in claim 49, wherein, when there are a plurality of bottle-receiving stations, a said valve is provided for each bottle-receiving station for regulating the discharge of water at said predetermined temperature to its respective bottle-receiving station.

51. A device as claimed in claim 44, wherein said regulator is arranged to regulate automatically the discharge to said at least one bottle-receiving station of a predetermined amount of water heated to said predetermined temperature.

52. A device as claimed in claim 51, wherein the regulator further includes an override to allow a user to terminate prematurely or to extend the discharge of heated water so as to change from said predetermined amount the amount of heated water discharged.

53. A device as claimed in claim 51, wherein the regulator includes a metering unit for metering said predetermined amount of heated water, said predetermined amount being less than the full capacity of the tank.

54. A device as claimed in claim 44, wherein the regulator is manually operable whereby, following reheating of the water to said predetermined temperature, the amount of water discharged may be manually regulated by a user.

55. A device as claimed in claim 54 wherein, when there are a plurality of bottle receiving stations, a separate switch is provided for each said station to allow a user to regulate manually the discharge of reheated water at said predetermined temperature.

56. A device as claimed in claim 44, further comprising a controller for controlling operation of the water heater and for controlling operation of the regulator whereby, during operation of the water heater in said second heating mode, the water heater is deactivated when the water temperature reaches said predetermined temperature and the regulator is then operable to allow water at said predetermined temperature to be discharged only to a user-selected bottle-receiving station.

* * * * *

UNITED STATES PATENT AND TRADEMARK OFFICE
CERTIFICATE OF CORRECTION

PATENT NO. : 6,170,386 B1
DATED : January 9, 2001
INVENTOR(S) : Claire Cecilia Paul It is certified that error appears in the above-identified patent and that said Letters Patent is hereby corrected as shown below:

Title page,
Under Other Publications,
Line 1, "Searh" should be -- Search --.

Abstract,
Line 5, after "temperature" insert -- of approximately 45-55°C --.
Line 6, "the" should be -- said --.
Line 8, "the" should be -- said --.

Column 4,
Line 60, "it" should be -- It --.

Column 7,
Line 49, "recieving" should be -- receiving --.

Signed and Sealed this

Thirtieth Day of October, 2001

Attest:

NICHOLAS P. GODICI
Attesting Officer *Acting Director of the United States Patent and Trademark Office*